United States Patent
Lin et al.

(10) Patent No.: US 10,460,205 B2
(45) Date of Patent: Oct. 29, 2019

(54) CLUSTERING IMAGES BASED ON CAMERA FINGERPRINTS

(71) Applicant: Functional Technologies Ltd., Burton Green (GB)

(72) Inventors: Xufeng Lin, Coventry (GB); Chang-Tsun Li, Burton Green (GB)

(73) Assignee: Functional Technologies Ltd., Warwickshire (GB)

( * ) Notice: Subject to any disclaimer, the term of this patent is extended or adjusted under 35 U.S.C. 154(b) by 45 days.

(21) Appl. No.: 15/757,279

(22) PCT Filed: Sep. 5, 2016

(86) PCT No.: PCT/GB2016/052726
§ 371 (c)(1),
(2) Date: Mar. 2, 2018

(87) PCT Pub. No.: WO2017/037478
PCT Pub. Date: Mar. 9, 2017

(65) Prior Publication Data
US 2018/0253626 A1 Sep. 6, 2018

(30) Foreign Application Priority Data
Sep. 3, 2015 (GB) .................................. 1515615.1

(51) Int. Cl.
*G06K 9/62* (2006.01)
*G06K 9/00* (2006.01)
*G06K 9/40* (2006.01)

(52) U.S. Cl.
CPC ......... *G06K 9/6223* (2013.01); *G06K 9/0051* (2013.01); *G06K 9/00577* (2013.01);
(Continued)

(58) Field of Classification Search
CPC ............... G06K 9/6223; G06K 9/0051; G06K 9/00577; G06K 9/40; G06K 9/6218; G06K 9/6221; G06K 2009/00583
See application file for complete search history.

(56) References Cited

U.S. PATENT DOCUMENTS

| | | | |
|---|---|---|---|
| 6,675,174 B1 * | 1/2004 | Bolle | ................. G06K 9/00711 |
| 7,609,846 B2 * | 10/2009 | Smith | .................. G06T 7/0008 |
| | | | 348/223.1 |

(Continued)

FOREIGN PATENT DOCUMENTS

GB 2486987 9/2013

OTHER PUBLICATIONS

Caldelli, Roberto et al., Fast Image Clustering of Unknown Source Images, 2010 IEEE International Workshop on Information Forensics and Security, Dec. 12, 2010, pp. 1-5.

*Primary Examiner* — Manav Seth
(74) *Attorney, Agent, or Firm* — Schmeiser, Olsen & Watts LLP

(57) ABSTRACT

A method of analyzing a set of digital images each having been captured with a digital camera, the method comprising, using at least one processor: a) extracting a camera fingerprint from each image so as to form a set of camera fingerprints, each camera fingerprint being representative of the camera used to capture the image, and being of a first dimension; b) forming a set of dimensionally reduced camera fingerprints from each camera fingerprint, the dimensionally reduced camera fingerprint being of a second dimension smaller than the first dimension; c) forming a first subset of dimensionally reduced camera fingerprints and a second subset of dimensionally reduced camera fingerprints; d) determining a level of similarity between every pairing of the dimensionally reduced camera fingerprints of the first subset; e) determining a level of similarity between every pairing of the dimensionally reduced camera fingerprints of the second subset; f) determining a level of similarity
(Continued)

Figure 1:
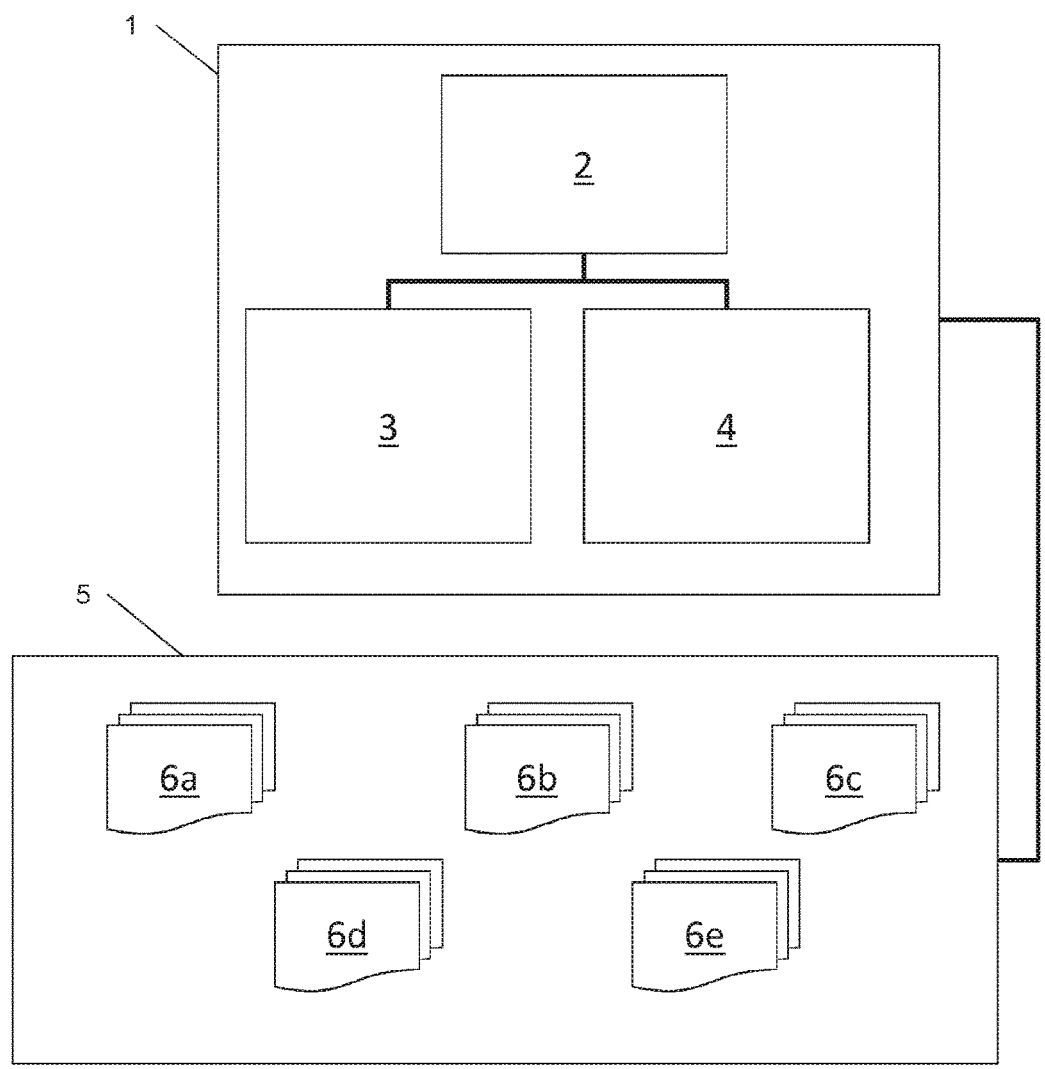

between every pairing of, on the one hand, the dimensionally reduced fingerprints of the first set and, on the other hand, the dimensionally reduced fingerprints of the second subset; g) recording those pairings which indicate a comparatively higher level of similarity; h) substituting for the contents of the first subset those dimensionally reduced camera fingerprints of the first and second subsets which have been recorded as part of a pairing showing a comparatively higher level of similarity; i) substituting for the contents of the second subset a different subset of the set of the dimensionally reduced camera fingerprints; j) repeating steps (e) to (i), typically until all of the dimensionally reduced camera fingerprints have been processed; k) performing a clustering algorithm on all dimensionally reduced camera fingerprints based on the pairings having a comparatively higher level of similarity to produce a plurality of first clusters each comprising a set of dimensionally reduced camera fingerprints; l) for each of the first clusters, determining a level of similarity between each of the camera fingerprints corresponding to the dimensionally reduced camera fingerprints of that cluster; and m) splitting and merging the coarse clusters dependent upon the similarities between the camera fingerprints to form a plurality of second clusters.

26 Claims, 2 Drawing Sheets

(52) U.S. Cl.
CPC ............ *G06K 9/40* (2013.01); *G06K 9/6218* (2013.01); *G06K 9/6221* (2013.01); *G06K 2009/00583* (2013.01)

(56) References Cited

U.S. PATENT DOCUMENTS

| | | | | |
|---|---|---|---|---|
| 7,787,030 | B2* | 8/2010 | Fridrich | G06K 9/00577 348/241 |
| 8,374,386 | B2* | 2/2013 | Bayram | G06K 9/00577 382/100 |
| 8,565,529 | B2* | 10/2013 | Chang-Tsun | G06K 9/6222 382/190 |
| 8,774,551 | B2* | 7/2014 | Suzuki | G06K 9/32 382/266 |
| 8,942,438 | B2* | 1/2015 | Ivanov | G06K 9/00006 382/124 |
| 9,224,030 | B2* | 12/2015 | Du | G06F 21/32 |
| 9,386,266 | B2* | 7/2016 | Parkhomenko | G06K 9/6218 |
| 9,858,503 | B2* | 1/2018 | Lu | G06K 9/4642 |
| 10,013,625 | B1* | 7/2018 | Ahammad | G06T 7/0002 |
| 10,133,924 | B2* | 11/2018 | Valsesia | G06K 9/00577 |
| 10,146,929 | B2* | 12/2018 | Du | G06F 21/32 |
| 10,297,011 | B2* | 5/2019 | Dirik | G06K 9/00577 |
| 2002/0083323 | A1* | 6/2002 | Cromer | H04N 1/32101 713/176 |
| 2002/0191091 | A1* | 12/2002 | Raynor | H04N 1/32128 348/241 |
| 2004/0113052 | A1* | 6/2004 | Johanneson | G06T 9/005 250/214 R |
| 2012/0087589 | A1* | 4/2012 | Chang-Tsun | G06K 9/40 382/190 |
| 2012/0195476 | A1* | 8/2012 | Bayram | G06K 9/00577 382/124 |
| 2017/0169293 | A1* | 6/2017 | Valsesia | G06K 9/00577 |
| 2018/0157680 | A1* | 6/2018 | Valsesia | G06K 9/00577 |
| 2019/0041836 | A1* | 2/2019 | Cella | G05B 23/024 |

* cited by examiner

CLUSTERING IMAGES BASED ON CAMERA FINGERPRINTS

This invention relates to a method of analysing a set of digital images, and to related apparatus.

High dimensional data are often encountered in areas such as medicine, image processing and text mining. Clustering such high dimensional data can be a very challenging task. In high dimensional space, many of the dimensions are often irrelevant and therefore confuse the clustering algorithm by hiding clustering in noisy data. Another reason why many clustering algorithms struggle with high dimensional data is the curse of dimensionality. With the increase of dimensionality, the required computational resources grow exponentially and the discrimination of the farthest and nearest point becomes statistically insignificant. The problem becomes even more intractable when the size of dataset increases. For a data set consisting of n data points, each with d dimensions, searching the pairwise relationship will have the time complexity of O(n2d). So for large scale and high dimensional data, the effectiveness of traditional clustering algorithms, such as k-means, fuzzy c-means (FCM) (J. C. Bezdek, R. Ehrlich, and W. Full, "Fcm: The fuzzy c-means clustering algorithm," Computers & Geosciences, vol. 10, no. 2, pp. 191-203, 1984.), hierarchical clustering (S. C. Johnson, "Hierarchical clustering schemes," Psychometrika, vol. 32, no. 3, pp. 241-254, 1967.), BIRCH (T. Zhang, R. Ramakrishnan, and M. Livny, "Birch: an efficient data clustering method for very large databases," in ACM SIGMOD Record, vol. 25, no. 2. ACM, 1996, pp. 103-114.) and DBSCAN (M. Ester, H.-P. Kriegel, J. Sander, and X. Xu, "A density-based algorithm for discovering clusters in large spatial databases with noise." in Kdd, vol. 96, no. 34, 1996, pp. 226-231.), is limited or invalid.

While the graph-based or matrix decomposition methods, such as CLICK (R. Sharan and R. Shamir, "Click: a clustering algorithm with applications to gene expression analysis," in Proc Int Conf Intell Syst Mol Biol, vol. 8, no. 307, 2000, p. 16.), Metis (G. Karypis and V. Kumar, "A fast and high quality multilevel scheme for partitioning irregular graphs," SIAM Journal on scientific Computing, vol. 20, no. 1, pp. 359-392, 1998.), Graclus (I. S. Dhillon, Y. Guan, and B. Kulis, "Weighted graph cuts without eigenvectors a multilevel approach," IEEE Transactions on Pattern Analysis and Machine Intelligence, vol. 29, no. 11, pp. 1944-1957, 2007.) and Spectral clustering (A. Y. Ng, M. I. Jordan, Y. Weiss et al., "On spectral clustering: Analysis and an algorithm," Advances in neural information processing systems, vol. 2, pp. 849-856, 2002.), require the connectivity information of graph or the adjacency matrix, the calculation of which is very expensive for large scale and high dimensional datasets.

Another challenge comes from the scenario where the size of cluster is much smaller than the number of clusters. The small clusters are probably treated as outliers and discarded by the clustering algorithm. This usually happens when we are dealing with massive amounts of data, such as are available on the Internet.

For example, there are several databases of images on the Internet, such as Flickr®. We have appreciated that it may be desirable cluster the images in such a database into a number of clusters, each including the images taken by the same camera. The camera which takes an image can be recognised by a subtle camera fingerprint, which is left in each digital image captured by that camera; one example of such a camera fingerprint is the sensor pattern noise. The number of cameras that have taken the images on Flicker is much higher that the number of images acquired by each camera. This is simply not achievable at proportional computational expense at present.

According to a first aspect of the invention, we provide a method of analysing a set of digital images each having been captured with a digital camera, the method comprising, using at least one processor:

a) extracting a camera fingerprint from each image so as to form a set of camera fingerprints, each camera fingerprint being representative of the camera used to capture the image, and being of a first dimension;

b) forming a set of dimensionally reduced camera fingerprints from each camera fingerprint, the dimensionally reduced camera fingerprint being of a second dimension smaller than the first dimension;

c) forming a first subset of dimensionally reduced camera fingerprints and a second subset of dimensionally reduced camera fingerprints;

d) determining a level of similarity between every pairing of the dimensionally reduced camera fingerprints of the first subset;

e) determining a level of similarity between every pairing of the dimensionally reduced camera fingerprints of the second subset;

f) determining a level of similarity between every pairing of, on the one hand, the dimensionally reduced fingerprints of the first set and, on the other hand, the dimensionally reduced fingerprints of the second subset;

g) recording those pairings which indicate a comparatively higher level of similarity;

h) substituting for the contents of the first subset those dimensionally reduced camera fingerprints of the first and second subsets which have been recorded as part of a pairing showing a comparatively higher level of similarity;

i) substituting for the contents of the second subset a different subset of the set of the dimensionally reduced camera fingerprints;

j) repeating steps (e) to (i), typically until all of the dimensionally reduced camera fingerprints have been processed;

k) performing a clustering algorithm on all dimensionally reduced camera fingerprints based on the pairings having a comparatively higher level of similarity to produce a plurality of first clusters each comprising a set of dimensionally reduced camera fingerprints;

l) for each of the first clusters, determining a level of similarity between each of the camera fingerprints corresponding to the dimensionally reduced camera fingerprints of that cluster; and m) splitting and merging the coarse clusters dependent upon the similarities between the camera fingerprints to form a plurality of second clusters.

As such, by first carrying out a first, typically coarse clustering on the dimensionally camera fingerprints, then carrying a second, finer, clustering on the camera fingerprints themselves to produce the second clusters, clustering of the camera fingerprints can be carried out using less in the way of processor power and memory. In effect, this method can make the clustering of a large database achievable using a desktop computer.

This method therefore proposes a clustering framework for large scale and high dimensional datasets, which utilises dimension reduction and a divide-and-conquer strategy to reduce the computational complexity. The proposed framework can operate in an iterative and continuously updating manner to discover the small clusters among a large number of unbalanced clusters.

The step of extracting a camera fingerprint may comprise processing the images using denoising filters, such as the Michak denoising filter (M. Mhak, I. Kozintsev, and K. Ramchandran, "Spatially adaptive statistical modeling of wavelet image coefficients and its application to denoising," in Proc. IEEE Int. Conf. on Acoustics, Speech, and Signal Processing, vol. 6, March 1999, pp. 3253-3256.) or the block-matching and 3D filtering (K. Dabov, A. Foi, V. Katkovnik, and K. Egiazarian, "Image denoising by sparse 3-d transform-domain collaborative filtering," IEEE Trans. on Image Processing, vol. 16, no. 8, pp. 2080-2095, August 2007.), and subtracting the denoised image from the original image. Typically, each camera fingerprint may be representative of the sensor pattern noise of the camera used to capture the image. The step may further comprise normalising the mean and/or standard deviation of each fingerprint, typically to zero mean and unit standard deviation.

The step of forming the dimensionally reduced camera fingerprints may comprise using a sparse random projection to reduce the dimension of each camera fingerprint.

The method may further comprise storing the camera fingerprints and the dimensionally reduced fingerprints, typically in a first storage, which may comprise a mass storage device such as a hard disk, or another secondary storage device, associated with each processor.

The first and second subsets may be of the same size. The first and second subsets may each be of a size such that the dimensionally reduced camera fingerprints they represent fit within a second storage, which may be a primary storage device, such as a random access memory associated with each processor; indeed, the method may comprise loading the dimensionally reduced camera fingerprints of the first and second subsets into the second storage. The first and second subsets may be of a size such that a further subset of dimensionally reduced camera fingerprints of the same size as the first and/or second subsets would not fit within the second storage. Thus, this allows efficient use of the storage of a processing system.

The steps of determining a level of similarity between dimensionally reduced camera fingerprints (steps e and f) may each comprise determining a correlation between the dimensionally reduced camera fingerprints. The correlation may be a normalised cross correlation. The steps may also comprise converting the similarity to a binary value by indicating similarity if the level of similarity (typically the correlation) is higher than a threshold and no similarity otherwise.

The step of recording the pairings (step g) may comprise recording in a set of lists, each for one dimensionally-reduced camera fingerprint, where the elements of each list indicate the dimensionally-reduced camera fingerprints that are sufficiently similar with the corresponding dimensionally-reduced camera fingerprint.

The step of substituting the contents of the first subset (step h) may comprise determining which elements of the first and second subsets have been recorded less frequently and eliminating those elements from the first and second subsets, with the elements which have not been eliminated then forming the new first subset. As such, this step may comprise determining a measure of frequency for each dimensionally reduced camera fingerprint, which may be calculated as:

$$p_i = \frac{deg(v_i)}{A_i}$$

where $p_i$ is the measure of frequency, $deg(v_i)$ is the number of pairings in which the dimensionally reduced camera fingerprint has been recorded and $A_i$ is the number of pairings in steps (d) and (e) for which a similarity including the dimensionally reduced camera fingerprint has been determined.

Step h may therefore include eliminating sufficient elements so that the first subset after substitution is the same size as before substitution.

The clustering algorithm used in step k may be a multi-level graph partition algorithm, such as the Graclus algorithm.

Step l may comprise the step of generating a matrix of the level of similarities between the camera fingerprints. The matrix may be binarised, such that each element can only have two values; as such, step l may comprise the step of applying a threshold to the level of similarities, such that an element in the matrix will indicate similarity if the level of similarity is greater than a threshold.

Step m may comprise applying a Markov clustering algorithm to the matrix. This will iteratively expands and inflates the matrix until it converges as a steady state.

The method may comprise capturing each of the images using a digital camera.

The method may comprise outputting, typically to first or second storage, the second clusters. Typically, each of the second clusters will indicate those digital images having similar camera fingerprints.

According to a second aspect of the invention, there is provided a processing apparatus comprising a processor arranged to carry out the method of the first aspect of the invention. The apparatus may comprise first storage being mass storage such as a hard disk or other secondary storage. The apparatus may also comprise second storage, typically being primary storage such as random access memory. The first or second storage may comprise program instructions which, when executed on the processor, will cause it to carry out the method of the first aspect of the invention.

Figure 2:
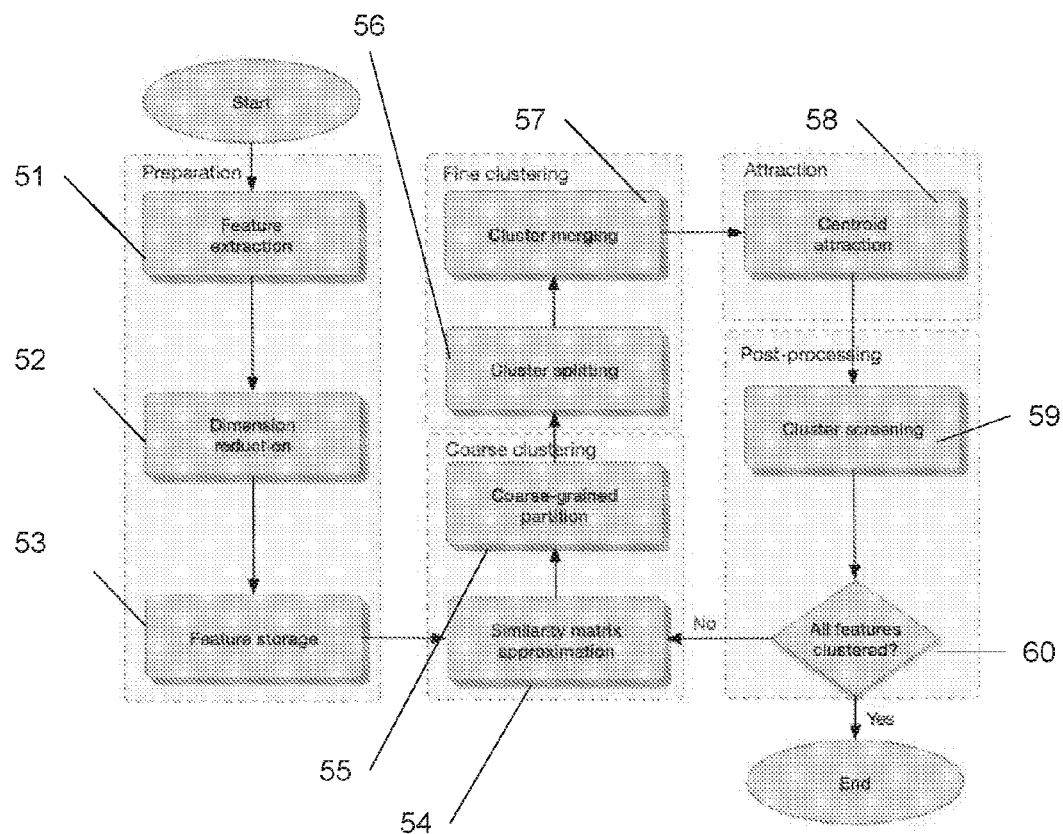

There now follows, by way of example only, description of an embodiment of the invention, described with reference to the accompanying drawings, in which:

FIG. 1 shows schematically the processing apparatus used in an embodiment of the invention; and FIG. 2 shows a flowchart showing the method used in the embodiment of FIG. 1.

A processing apparatus 1, such as a personal computer, is shown in FIG. 1, which can be to implement an embodiment of the invention. The processing apparatus 1 comprises a processor 2 coupled to mass storage 3 (secondary storage, such as a hard disk) and random access memory (primary storage 4).

The processing apparatus 1 is also linked to a database of digital images 6a-6e, which have been captured using a plurality of digital cameras. Each camera leaves a particular camera fingerprint in each of the images. These fingerprints can be extracted from the images and used to identify the camera which took a particular image. Whilst each of the groups of photos 6a-6e have each been taken with a digital camera, it is desired to cluster the database, to work out which images have been taken with which cameras without any prior knowledge of which camera corresponds to which image.

In order to achieve this, the method shown in FIG. 2 of the accompanying drawings is carried out. In summary, as explained below, it comprises the following steps:

Phase 1: Preparation

Fingerprint extraction and standardization (step 51): fingerprints in d-dimensional space are extracted and standardized into new ones with zero means and unit standard deviations.

Dimensionality reduction (step 52): each extracted fingerprint is projected onto a k-dimensional space using the sparse random projection.

Fingerprint storage: store each full-length and the corresponding dimension-reduced fingerprints into a single file (step 53).

Phase 2: Coarse Clustering

Similarity matrix approximation (step 54): a pairwise similarity matrix M sized n×n is calculated using the projected fingerprints, where n is the cardinality of fingerprint set. Any entry in the similarity matrix that is greater than a pre-defined threshold t is binarized into 1, otherwise it is 0. Notice that t depends on the similarity measurement used and the characteristics of fingerprints.

Coarse-grained partitioning (step 55): based on the binarized similarity matrix, coarsely cluster the n fingerprints using a fast graph clustering algorithm. Therefore, a certain number of coarse clusters are formed. Subsequently, the coarse clusters are recursively bisected to assure any of them can be fit into the RAM at a time.

Phase 3: Fine Clustering

Cluster splitting (step 56): suppose the further recursive bisections finally result in $n_c$ clusters. Then for each of the $n_c$ coarse clusters, a smaller and accurate similarity matrix is calculated and binarized as in coarse clustering but using the full-length fingerprints. Because the cluster size is much smaller than the cardinality of fingerprint set (n), it does not require too many computational resources. For each binary similarity matrix corresponding to one coarse cluster, the cluster is split naturally into $n_s$ sub-clusters with variable sizes using a flow simulation based graph clustering algorithm.

Cluster merging (step 57): each of the $n_s$ split sub-clusters is represented by the centroid of the full-length fingerprints within the same cluster. Based on the centroids, a pairwise similarity matrix is calculated and binarized using a adaptive threshold matrix τ (the entry $\tau_{ij}$ depends on the sizes and the qualities of sub-cluster $S_i$ and sub-cluster $S_{ji}$). Larger sub-clusters are therefore recognized with the help of the flow simulation based graph clustering algorithm by merging two or several split sub-clusters, and the centroids of the merged clusters are updated at the same time.

Phase 4: Attraction

Centroid attraction (step 58): use the centroids as "attractors" to attract unclustered fingerprints left in the database, so that all fingerprints belong to the discovered clusters will be absorbed to form larger clusters, leaving the minority of fingerprints remaining unclustered in the database.

Phase 5: Post Processing

Cluster screening and storage (step 59): screen out the clusters with a size smaller than a threshold and store the remaining clusters as the final or mediate clusters. The stored information of each cluster includes the centroid, the number of fingerprints and the quality of the cluster.

Termination or continuation (step 60): algorithm ends if no more notable clusters can be discovered. Otherwise, put the unclustered fingerprints as well as those in the screened clusters back into the database for the next round iteration starting from the coarse clustering.

Looking at these steps in more detail:

In the first step 51, the camera fingerprint—in this embodiment, the sensor pattern noise—is extracted for each image by subtracting the denoised image from the original image. This results in a d-dimensional fingerprint stored in the mass storage 3.

After the fingerprints are extracted in the d-dimensional space, the normalized cross correlation (NCC) ρ can be used as the similarity measurement between every two fingerprints, X and Y:

$$\rho(X, Y) = \frac{\sum_{i=1}^{d}(X[i] - \overline{X})(Y[i] - \overline{Y})}{\sqrt{\sum_{i=1}^{d}(X[i] - \overline{X})^2} \sqrt{\sum_{i=1}^{d}(Y[i] - \overline{Y})^2}} \quad (1)$$

where d is the length of fingerprint, $\overline{X}$ and $\overline{Y}$ are the arithmetic mean of X and Y, respectively.

NCC is widely used as a similarity measurement in many areas, such as machine learning, image processing and statistical signal detection, but it is notorious for its high computational cost due to the calculation of average and especially the variances in the denominator of Equation 1. However, each d-dimensional fingerprint can be pre-standardized to have zero mean and unit variance. So Equation (1) can be easily simplified as the element-wise product:

$$\rho(X, Y) = \frac{1}{d}\sum_{i=1}^{d}\hat{X}[i]\hat{Y}[i], \quad (2)$$

where $\hat{X}$ and $\hat{Y}$ are the standardized version of X and Y, respectively.

The NCC ρ of two fingerprints, X and Y, and the Euclidean distance D between their standardized versions, $\hat{X}$ and $\hat{Y}$, have the following relationship:

$$\rho(X, Y) = 1 - \frac{D^2(\hat{X}, \hat{Y})}{2d}. \quad (3)$$

So for the standardized fingerprints, NCC is equivalent to the Euclidean distance. Another benefit of standardization is that many Euclidean distance preserving dimension reduction methods are potentially for use to reduce the computational cost (at step 52). Unfortunately, dimension reduction techniques based on the discrete Fourier transform (DFT), singular value decomposition (SVD), discrete wavelets transform (DWT) and piecewise aggregate approximation (PPA), are not applicable to signals with uniform spectral distributions.

More advanced methods, such as principal components analysis (PCA), multidimensional scaling, isometric mapping, maximal variance unfolding and locally linear embedding, become practically infeasible for large-scale and high-dimensional fingerprints due to the high computational costs and the mutual dependencies of data. We therefore resort to another more efficient solution—sparse random projection, due to its appealing properties of Euclidean distance preserving, computational efficiency and data independence. Random projection is theoretically based on the Johnson-Lindenstrauss lemma, which states that any high dimensional dataset can be randomly projected onto a lower dimensional Euclidean space while controlling the distortion in the pairwise distances as explained in D. Achlioptas, "Database-friendly random projections: Johnson-Lindenstrauss with binary coins," Journal of computer and System Sciences, vol. 66, no. 4, pp. 671-687, 2003.

Let d×n matrix A be the set of n fingerprints in Rd. We call each of the d-dimensional columns a fingerprint. Let R be the k×d random projection matrix with $R(i, j)=r_{ij}$, where $\{r_{ij}\}$ are independently drawn from following probability distribution:

$$r_{ij} = \sqrt{\frac{s}{k}} \times \begin{cases} +1 & \text{with probability} \quad 1/2s, \\ 0 & \text{with probability} \quad 1-1/s, \\ -1 & \text{with probability} \quad 1/2s \end{cases} \quad (4)$$

where $s=\sqrt{d}$. The dimension reduction of the n fingerprints from $R^d$ to $R^k$ is achieved by:

$$E=RA \quad (5)$$

where E is a k×n matrix, with its columns representing the dimension-reduced fingerprints.

Finally, the standardized fingerprints and their dimension-reduced counterparts are stored in the mass storage 3 into a single file with a unique filename (step 53).

One of the major challenges of clustering large-scale and very high-dimensional fingerprints is how to discover the potentially correlated fingerprint pairs. The exhaustive search requires n2 pairwise comparisons, which become clearly prohibited even for the dimension-reduced data when n is large. Even if it were possible to determine all pairwise similarities, it is still a big challenge to keep the huge n×n sized similarity matrix M in the memory 4. Taking n=1,000,000 for instance, requires 3,725 GB RAM to store the pairwise matrix if each matrix entry is of 4-bytes float type.

One optimization is to utilize the symmetry property of a pairwise similarity matrix. It saves half of the required RAM but is still too large even for modern high-performance computers.

Another workaround is to calculate a small proportion of the n2 matrix entries, then the core issue becomes what heuristics or criteria can be used to select the matrix entries to be calculated. Practically speaking, the similarity matrix is very likely to be sparse because only the fingerprints from the same cluster are correlated with each other. So in order to make the pair-wise similarity matrix sparse, we use an empirical threshold t to binarize the matrix entries. Besides, the binarization also saves RAM space by converting real-type into Boolean-type data.

Since the intrinsic quality of fingerprints depends on many complex factors, the averaged intra-cluster similarities for different clusters may vary greatly. But in the sense of clustering, one cluster with a higher averaged intra-cluster similarity should be equivalent to another cluster with a lower averaged intra-cluster similarity. In this regard, binarization is an effective way to eliminate the inter-cluster divergence and therefore make the clustering more robust against different sources of interferences. If each d-dimensional fingerprint is represented by a vertex vi, I=1, 2, . . . , n, in a graph G, the sparse similarity matrix M can be collapsed into a set of linked lists L, of which each element Li is a list recording the vertices that are sufficiently similar with vertex vi.

Having ameliorated the retention of the pairwise similarity matrix in the RAM 4, let us get back to the issue of discovering the correlated fingerprint pairs (step 54). Due to the limited capability of RAM 4, it is advisable to devise a RAM-efficient way to select and calculate the matrix entries. Given n dimension-reduced fingerprints, we partition them into batches of the same size q, except of the last batch which may be smaller. Here q can be customized so that the RAM 4 is sufficient for simultaneously accommodating two batches and the extra space for calculating the inter-batch similarities.

The first batch two batches of dimensionally-reduced fingerprints are brought to the RAM 4, and all pairwise intra-batch similarities are calculated, which will be binarized and used to update the adjacency list L. All remaining batches are sequentially loaded from disk one at a time. When such a batch is read, the intra-batch similarities and the inter-batch similarities between the current and the previous batch are calculated, binarized and used to update L again.

From the third batch on, if we want to proceed with the next batch, at least q vertices (fingerprints) have to be evicted from the RAM 4 due to the limited RAM 4 size.

So we define a potential pi for each vertex vi, which varies between 0 and 1, and is initialised at 0:

$$p_i = \frac{deg(v_i)}{A_i}$$

where $deg(v_i)$ is the degree of vertex $v_i$, and $A_i$ is the accumulated number of vertices whose connectivities with vertex $v_i$ have been investigated up to the latest batch.

So as to accommodate the new coming batch, only the q vertices with the highest potential are retained in the RAM 4. The motivation behind this is the fact that the more correlated fingerprints a fingerprint has among those that have been investigated, the more likely that it will be correlated with more fingerprints among the fingerprints that have not been investigated yet.

One aim is to discover the correlated fingerprint pairs as many as possible. So in this manner, the correlated pairs are discovered to a great extent from the limited amount of similarity calculations by benefiting from the unbalanced distribution of clusters. Meanwhile, the input/output (I/O) cost is minimized because every dimension-reduced fingerprint is loaded only once. But it is worth noting that we use pi instead of deg(vi) because the number of pairwise comparisons for the vertices in the posterior batches is less than that for the vertices in the previous batches. As a result, the earlier loaded vertices (fingerprints) will tend to have a higher degree than the later loaded ones.

At step 55, with the rough sketch of graph stored in L, we feed it into a multilevel graph-partitioning algorithm Graclus (I. S. Dhillon, Y. Guan, and B. Kulis, "Weighted graph cuts without eigenvectors a multilevel approach," IEEE Transactions on Pattern Analysis and Machine Intelligence, vol. 29, no. 11, pp. 1944-1957, 2007), which uses the optimized weighted kernel k-means under the multilevel framework of Metis (G. Karypis and V. Kumar, "A fast and high quality multilevel scheme for partitioning irregular graphs," SIAM Journal on scientific Computing, vol. 20, no. 1, pp. 359-392, 1998). The original graph G0 is repeatedly coarsened into smaller and smaller graphs G1, G2, . . . , Gm by combining a set of nodes that are strongly connected with each other into a supernode. The coarsening process stops at a point where very few nodes remain in the graph, then a spectral clustering algorithm (I. S. Dhillon, Y. Guan, and B. Kulis, A unified view of kernel k-means, spectral clustering and graph cuts. Citeseer, 2004.) is directly applied on the coarsest graph Gm, the clustering of which will induce an initial clustering of the higher level graph Gm−1, i.e., if a supernode in Gm is in one cluster, then all nodes in Gm−1 formed from that supernode are in that cluster. With the initial clustering of Gm−1, an optimized weighted kernel k-means is used to refine the clustering in graph Gm−1. Since we have a good initial clustering, the refinement usually converges very quickly. The multilevel process terminates until the refinement process is performed on the original graph G0. By empirically specifying the cluster number $n_c = \sqrt{n}$, Graclus partitions the n fingerprints into nc coarse clusters with various sizes, among which some larger coarse clusters will be recursively bisected into smaller clusters to ensure that each of them can be fit into the RAM 4 at a time. The purpose of coarse clustering is to put potentially correlated fingerprints into the same batch, which will be processed by the fine clustering to form meaningful and accurate clusters.

After coarsely partitioning the dataset, the coarse clusters will be further split (step 56) and merged (step 57) in the fine clustering stage, making the final clustering results insensitive to the parameter nc of Graclus. Specifically, for each of the resulting coarse clusters, an accurate similarity matrix is calculated and binarized as in the coarse clustering stage but using the full-length rather than the dimension-reduced fingerprints. As the number of fingerprints in each coarse cluster is much smaller than that of the whole dataset, it does not require too many computational resources.

The binarized matrix is input to the Markov cluster algorithm (MCL) (S. M. Van Dongen, "Graph clustering by flow simulation," 2001), the underlying basis of which is the truth that a random walk in a graph that visits a dense cluster will likely not leave the cluster until many of its vertices have been visited. So if natural clusters are present in the graph, the flow across borders between different clusters will wither away, thus revealing cluster structure in the graph. By transforming a graph into a Markov graph, i.e. a graph where for all nodes the weights of outgoing edges sum to one, the flow can be simulated by the matrix multiplication, which is referred as the expansion operator. Then an inflation operator that applies entry-wise matrix product and renormalization along each column is performed to strengthen the strong flows and weaken the weak flows. The two operators are repeated iteratively until the resulting Markov matrix converges to a steady state. Finally, the clusters are revealed by interpreting the resulting Markov matrix. Given a small enough coarse cluster, many alternative algorithms are actually feasible for clustering. But the following merits make MCL preferable to other methods:

1. The number of clusters is naturally discovered by interpreting the resulting matrix, so it does not require the user to specify the number of clusters beforehand. That is a reason why the Graclus algorithm used in the coarse clustering stage is not used at this stage; additionally, the quality of the clusters produced by MCL is much higher than that of Graclus.
2. The native implementation of MCL is slow, but it can be dramatically sped up by taking advantage of the sparseness of the similarity matrices and pruning the small values of the resulting matrix during each iteration.
3. One of the disadvantages of MCL is that it tends to split up the clusters with large diameter, resulting in smaller cluster granularity but higher precision rate. Interestingly, this disadvantage is reversed into an advantage. As being confronted with massive fingerprints, it is difficult to achieve high recall rate and high precision rate at the same time. Mixing the fingerprints from different classes in the same cluster (low precision rate) can lead to error propagation in the future clustering or retrieve, but dispersing the fingerprints from the same class into several clusters (low recall rate) may still guarantee correct retrieves despite extra computational cost. Therefore, if we have to sacrifice in one aspect to gain in the other, we would usually prefer the high precision rate to the high recall rate in practice.

The split of coarse clusters may produce many very small or even singleton sub-clusters, but only the sub-clusters with a score greater than a pre-defined threshold is are treated as notable clusters and collected for further use:

$$\xi = \sqrt{|C|} \frac{\sum_{v_i \in C} \sum_{v_j \in C} \omega_{ij}}{|C|(|C|-1)} \tag{7}$$

where |C| is the size of cluster C, is a binary variable, with 1 signifying that $v_i$ is correlated with $v_j$.

The fingerprints from the same class are likely partitioned into different coarse clusters. Even in the same coarse cluster, they may also be split into several different sub-clusters, so it is desirable to merge the sub-clusters for both efficiency and accuracy reasons before proceeding further. If we can know how the similarities changes with the sizes of the two sub-clusters in question, an adaptive threshold strategy can be adopted to determine whether to merge them or not. Afterwards, we refer to the similarity between two sub-clusters from the same class as the intra-class similarity, and the one between two sub-clusters from different classes as the inter-class similarity.

Intuitively, the intra-class similarity will increase with the size of sub-cluster but the inter-class similarity remains the same. However, there exists the probability that a small portion of fingerprints within the same sub-cluster are from one or several different classes, which may lead to the increase of inter-class similarity.

To simplify the problem, we make some assumptions. We assume that the d components of each fingerprint are independent, identically distributed random variables, and each fingerprint in one class has the same quality and is standardized to have zero mean and unit variance before calculating the similarity. Consequently, each standardized fingerprint can be modelled as the sum of the true fingerprint fi and independent noise αi:

$$F[i] = f_i + \alpha_i, \; i=1,3,3,\ldots,d, \tag{8}$$

where d is the length of the estimated fingerprint, $\alpha_i \sim N(0, \sigma^2)$ is White Gaussian Noise (WGN) and $f_i$ is the true fingerprint, which also conforms to normal distribution $N(0, 1-\sigma^2)$.

Hereafter, we refer to 1−σ2 as the quality of true fingerprint and σ2 as the power of independent noise in one individual standardized fingerprint. We further assume that the fingerprints of two different classes are independent. The similarity coefficient, ρ, between two standardized fingerprints, X and Y, is shown in Equation (2), where X[i]=xi+αi, Y[i]=yi+βi, αi~N(0, σx2), and βi~N(0, σy2). When determining whether to merge two sub-clusters, we will consider the centroids averaged from nx fingerprints in one sub-cluster and ny fingerprints in the other sub-cluster, respectively. Next, we will derive the distribution of inter-class correlation and intra-class correlation in different scenarios.

Scenario 1: nx=ny=1, σx2=σy2=σ2: In this simplest scenario, we assume that the true fingerprints in X and Y are of the same quality, i.e. σx2=σy2=σ2. If they are from different classes, using the Central Limit Theorem (CLT), ρ(X, Y)~N(0, 1/d). However, if X and Y are from the same class, which means xi=yi, We rewrite ρ(X, Y) as follows:

$$\rho(X, Y) = \frac{1}{d}\sum_{i=1}^{d}(x_i^2 + \alpha_i x_i + \beta_i x_i + \alpha_i \beta_i). \quad (9)$$

We know that $x_i \sim N(0, 1-\sigma^2)$, therefore $x_i^2/(1-\sigma^2)$ conforms to the chi-squared distribution with 1 degree of freedom~$\chi(1)$. We can easily get the mean and variance of $x_i^2$: $E(x_i^2)=1\sigma^2$, $D(x_i^2)=2(1-\sigma^2)^2$. From the assumption that $x_i$, $\alpha_i$, and $\beta_i$ are mutually independent, we can derive the mean and variance for the ith component of the full-length fingerprint $$\begin{cases} E(x_i^2 + \alpha_i x_i + \beta_i x_i + \alpha_i \beta_i) = 1 - \sigma^2 \\ D(x_i^2 + \alpha_i x_i + \beta_i x_i + \alpha_i \beta_i) = 2 - 2\sigma^2 + \sigma^4 \end{cases} \quad (10)$$

According to CLT:

$$\rho(X, Y) \sim N(\mu_1, \Sigma_1), \quad (11)$$

where:

$$\begin{cases} \mu_1 = 1 - \sigma^2 \\ \Sigma_1 = (2 - 2\sigma^2 + \sigma^4)/d \end{cases} \quad (12)$$

Scenario 2: nx=ny=1, σx2=σ2, σy2=λσ2: In this scenario, we assume the qualities of the true fingerprints in X and Y are different. Notice that it does not conflict with the assumption that the true fingerprints from the same class are of the same quality. Because even the qualities of all individual fingerprints are of the same, when different numbers of fingerprints are averaged together, the qualities of true fingerprint in the resulting centroids may vary significantly. In this scenario, although X and Y are referred to as two fingerprints with different qualities, they can be viewed as two centroids averaged from two clusters with different numbers of fingerprints in them.

Under the present circumstance, xi~N(0, 1−σ2), αi~N(0, σ2), yi~N(0, 1−λσ2) and βi~N(0, λσ2). For two fingerprints form different classes, xi, yi, αi and βi are mutually independent. Similarly, using the CLT, ρ(X,Y)~N(0,1/d). But if X and Y are from the same class, we assume yi=axi. By solving:

$$1-\lambda\sigma^2 = a^2(1-\sigma^2) \quad (13)$$

we can get $a=\sqrt{(1-\lambda\sigma^2)/(1-\sigma^2)}$. Therefore equation (9) can be rewritten as:

$$\rho(X, Y) = \frac{1}{d}\sum_{i=1}^{d}(ax_i^2 + a\alpha_i x_i + \beta_i x_i + \alpha_i \beta_i). \quad (14)$$

For the ith component:

$$\begin{cases} E(ax_i^2 + a\alpha_i x_i + \beta_i x_i + \alpha_i \beta_i) = \sqrt{(1-\sigma^2)(1-\lambda\sigma^2)} \\ D(ax_i^2 + a\alpha_i x_i + \beta_i x_i + \alpha_i \beta_i) = 2 - (1+\lambda)\sigma^2 + \lambda\sigma^4 \end{cases} \quad (15)$$

Therefore:

$$\rho(X, Y) \sim N(\mu_2, \Sigma_2), \quad (16)$$

where:

$$\begin{cases} \mu_2 = \sqrt{(1-\sigma_x^2)(1-\sigma_y^2)} \\ \Sigma_2 = [1 + (1-\sigma_x^2)(1-\sigma_y^2)]/d \end{cases} \quad (17)$$

By setting λ=1, Scenario 2 is equivalent to Scenario 1.

Scenario 3: σx2=σ2, σy2=λσ2: Suppose X and Y are two centroids generated by averaging two fingerprint sets with size nx and ny, respectively. In this more general scenario, if we can figure out the quality of the true fingerprint in the centroids, then we can use the conclusion of Scenario 2 to determine the distribution of the similarity between two centroids. For the centroids of two different classes, we still have the same conclusion ρ(X, Y)~N(0, 1/d). For two centroids from the same class, we assume that the qualities of all individual fingerprints in the same cluster are the same. If n such fingerprints are averaged before standardization, then the quality of true fingerprint, (1−σ2), remains unchanged, but the power of independent noise becomes σ2/n. So after standardization, the equivalent quality of true fingerprint in the centroid becomes:

$$\frac{1-\sigma^2}{1-\sigma^2+\sigma^2/n} = \frac{n(1-\sigma^2)}{n(1-\sigma^2)+\sigma^2}. \quad (18)$$

Specifically, we suppose $n_x$ and $n_y$ fingerprints are averaged to X and Y, respectively. So replacing n in Equation (18) with $n_x$ and $n_y$, $\sigma^2$ with $\sigma_x^2$ and $\sigma_y^2$ yields the distributions for the ith components of the two centroids:

$$\begin{cases} x_i \sim N(0, n_x(1-\sigma_x^2)/[n_x(1-\sigma_x^2)+\sigma_x^2]) \\ \alpha_i \sim N(0, \sigma_x^2/[n_x(1-\sigma_x^2)+\sigma_x^2]) \end{cases} \quad (19)$$

and $$\begin{cases} y_i \sim N(0, n_y(1-\sigma_y^2)/[n_y(1-\sigma_y^2)+\sigma_y^2]) \\ \beta_i \sim N(0, \sigma_y^2/[n_y(1-\sigma_y^2)+\sigma_y^2]) \end{cases} \quad (20)$$

Following the conclusion of Scenario 2, the distribution of ρ for two centroids from the same class is:

$$\rho(X, Y) \sim N(\mu_3, \Sigma_3), \quad (21)$$

where $$\begin{cases} \mu_3 = \sqrt{\dfrac{n_x(1-\sigma_x^2)n_y(1-\sigma_y^2)}{[n_x(1-\sigma_x^2)+\sigma_x^2][n_y(1-\sigma_y^2)+\sigma_y^2]}} \\ \Sigma_3 = \dfrac{2n_xn_y(1-\sigma_x^2)(1-\sigma_y^2)+n_x(1-\sigma_x^2)\sigma_y^2 +}{[n_x(1-\sigma_x^2)+\sigma_x^2][n_y(1-\sigma_y^2)+\sigma_y^2]d} \\ \quad\quad\;\; \dfrac{n_y\sigma_x^2(1-\sigma_y^2)+\sigma_x^2\sigma_y^2}{} \end{cases} \quad (22).$$

By setting nx=ny=1, Equation (22) becomes Equation (17). But in practice, λ varies from different fingerprints, making:

The intra-class correlation distribution a Gaussian mixture distribution rather than a unimodal Gaussian distribution. Approximating the variance of a Gaussian mixture distribution with that of a unimodal Gaussian distribution yields considerable errors, but the mean indicated in Equation (22) does reveal where the similarity coefficients are scattered around. Remember our objective is to determine whether to merge two sub-clusters, so an adaptive threshold i related with the mean of intra-class distribution is defined as:

$$\tau = \frac{\epsilon\sqrt{n_x(1-\sigma_x^2)n_y(1-\sigma_y^2)}}{\sqrt{[n_x(1-\sigma_x^2)+\sigma_x^2][n_y(1-\sigma_y^2)+\sigma_y^2]}}. \quad (23)$$

where ε is a pre-defined coefficient controlling the purity of the clustering. When the similarity between the centroids of two sub-clusters are greater than τ, we merge them together. As can be seen in Equation (23), τ is determined in a controllable and tunable way, and it is much safer than the threshold determined by the Neyman-Pearson criterion when the cluster size keeps increasing, because it is related with the fluctuating mean of the intra-class distribution rather than the constant inter-class distribution. By this means, τ can effectively prevent the cluster merging from propagating errors into the merged clusters.

The last parameter in Equation (23) to be determined is σx2 or σy2, which is the quality of one individual fingerprint in the sub-cluster. Recalling μ1 in Equation (12), it means that the quality of one individual fingerprint, 1−σ2, can be estimated by calculating the mean of similarities. So when coarse clusters are split into s sub-clusters, we can initially estimate the σi2 for each sub-cluster according to Equation (12):

$$\sigma_i^2 = 1 - \frac{1}{q_i}\sum_{k=1}^{q_i}\rho_k, \quad i = 1, 2, \ldots, n_s, \quad (24)$$

where $q_i$ is the number of calculated similarities within sub-cluster $S_i$. Then in the cluster merging stage, two sub-clusters $S_x$ and $S_y$ are merged into $\hat{S}$. With $\sigma_x^2$ and $\sigma_y^2$ recorded for $S_x$ and $S_y$, we update the equivalent power of independent noise, $\hat{\sigma}^2$, in the centroid of $\hat{S}$ as follows:

$$\hat{\sigma}^2 = \frac{n_x\sigma_x^2 + n_y\sigma_y^2}{n_x + n_y}, \quad (25)$$

where $n_x$ and $n_y$ are the numbers of fingerprints in cluster $S_x$ and $S_y$, respectively. Specially, when $\sigma_x^2=\sigma_y^2=\sigma^2$, the $\hat{\sigma}^2$ for the merged cluster $\hat{S}$ is the same as that of $S_x$ or $S_y$, i.e. $\hat{\sigma}^2=\sigma^2$. Equation (25) can be easily generalized for merging c sub-clusters:

$$\hat{\sigma}^2 = \frac{\sum_{i=1}^{c}n_i\sigma_i^2}{\sum_{i=1}^{c}n_i}, \quad (26),$$

where $n_i$ and $\sigma_i^2$ are the number of fingerprints and the quality of sub-cluster $S_i$.

In step 58, the merged clusters are used as "attractors" to attract the fingerprints remaining in the database, so that the fingerprints belonging to the same cluster will be absorbed into the corresponding attractor to form one larger cluster. One fingerprint F belongs to attractor A*if $$A^* = \underset{A_i \in \mathcal{A}}{\operatorname{argmax}} \rho(A_i, F), \rho(A^*, F) > \tau_\rho, \quad (27)$$

where A is the set of attractors, $\tau_\rho$ is calculated from Equation (23). Finally, the attracted fingerprints belonging to the same cluster in the database are merged into the corresponding attractor and update the quality for each merged attractor. But the similarity coefficient calculated in Equation (27) is between one centroid and one fingerprint rather than two individual fingerprints, so it is slightly different from Equation (24). Suppose the attractor $A_x$ is averaged from $n_x$ fingerprints with a quality of noise, $\sigma_x^2$, then the quality of noise, $\sigma_y^2$, for each of the $n_y$ attracted fingerprints is estimated using $\mu_3$ in Equation (22) by setting $n_y=1$:

$$\sigma_y^2 = 1 - \frac{[n_x(1-\sigma_x^2)+\sigma_x^2]\left(\sum_{k=1}^{n_y}\rho_k\right)^2}{n_x n_y^2(1-\sigma_x^2)}. \quad (28)$$

The fingerprint set forming the attractor Ax and the fingerprint set of ny attracted fingerprints can be viewed as two clusters with the power of independent noise, σx and σy, respectively. So according to Equation (25), the power of independent noise and the number of fingerprints in the attractor are updated as $$\begin{cases} \sigma_x^2 \leftarrow \dfrac{\pi_1 - \pi_2\pi_3}{n_xn_y(n_x+n_y)(1-\sigma_x^2)} \\ n_x \leftarrow n_x + n_y \end{cases}, \quad (29)$$

where the left arrow symbol represents the assignment operator and $$\begin{cases} \pi_1 = n_x n_y (1-\sigma_x^2)(n_x \sigma_x^2 + n_y) \\ \pi_2 = n_x(1-\sigma_x^2) + \sigma_x^2 \\ \pi_3 = \left(\sum_{k=1}^{n_y} \rho_k\right)^2 \end{cases} \quad (30)$$

In step 59, post-processing is carried out on the clusters. Up to now, the clustering process has formed a certain number of clusters, each of which is presented by a centroid, the unique indices of fingerprints in the database and the averaged quality of fingerprint in one cluster. The clusters with a size greater than a threshold η are stored as final clusters or mediate clusters that can be used for future merge. The clusters with a size less than η as well as the remaining unclustered fingerprints are put back to the database for the next round clustering. Due to the nature of coarse clustering, the classes with a larger size are more likely to form meaningful clusters, so usually the majority of the fingerprints have been clustered and only few fingerprints go into the next round clustering. During the coarse clustering stage of next iteration, we put the unclustered fingerprints from the same batch in the previous iteration into different batches so as to increase the probability of discovering correlated fingerprint pairs. Algorithm stops (step 60) when no more notable clusters can be discovered.

As described above, the large dataset is roughly partitioned into a number of small batches in the coarse clustering stage. While in the fine clustering stage, the coarse clusters are firstly split into ns sub-clusters, the qualities of which are initially estimated using Equation (12). Then sub-clusters are merged if the similarities between their centroids are greater than the threshold determined by Equation (23). The power of independent noise in the cluster merged from several sub-clusters is updated according to Equation (26). Finally in the attraction stage, the unclustered fingerprints are absorbed to the most similar centroid with a similarity higher than the threshold determined by Equation (23). After merging the absorbed fingerprints into the corresponding centroid, Equation (29) is used to update the power of independent noise of the centroid. Together with the centroid, the power of independent noise and the number of fingerprints are stored as the auxiliary information to calculate the threshold in Equation (23) for further merge. By this continuously updating manner, we can obtain an increasingly accurate σ2 for one growing cluster and therefore estimate a reliable threshold τ for cluster merging and centroid attraction.

The reasons why the proposed clustering framework can cope with large-scale camera fingerprint databases even when the number of classes is much higher than the averaged class size become clear. By taking advantage of the dimension reduction technique and the sparseness of the pairwise similarity matrix, the clustering problem of a large dataset is broken down into the clustering of several smaller datasets with the help of fast but approximate graph partition algorithm. The adaptive thresholding significantly reduces the computational complexity and allows the clustering results of small datasets to be combined to give the solution to the original problem. The ability of spotting small classes is conferred by the iterative clustering manner and the adaptive value of coarse cluster number $n_c = \sqrt{n}$. On one hand, the iterative manner guarantees that the larger classes will be clustered in the first few iterations while the smaller classes will be more focused on in the ensuing iterations. On the other hand, with the decreasing number of coarse clusters, the probability that two or more fingerprints from smaller classes fall into the same coarse cluster increases, making them more easily to be discovered in the fine clustering stage.

The invention claimed is:

1. A method of analysing a set of digital images each having been captured with a digital camera, the method comprising, using at least one processor:
   a) extracting a camera fingerprint from each image so as to form a set of camera fingerprints, each camera fingerprint being representative of the camera used to capture the image, and being of a first dimension;
   b) forming a set of dimensionally reduced camera fingerprints from each camera fingerprint, the dimensionally reduced camera fingerprint being of a second dimension smaller than the first dimension;
   c) forming a first subset of dimensionally reduced camera fingerprints and a second subset of dimensionally reduced camera fingerprints;
   d) determining a level of similarity between every pairing of the dimensionally reduced camera fingerprints of the first subset;
   e) determining a level of similarity between every pairing of the dimensionally reduced camera fingerprints of the second subset;
   f) determining a level of similarity between every pairing of, on the one hand, the dimensionally reduced fingerprints of the first set and, on the other hand, the dimensionally reduced fingerprints of the second subset;
   g) recording those pairings which indicate a comparatively higher level of similarity;
   h) substituting for the contents of the first subset those dimensionally reduced camera fingerprints of the first and second subsets which have been recorded as part of a pairing showing a comparatively higher level of similarity;
   i) substituting for the contents of the second subset a different subset of the set of the dimensionally reduced camera fingerprints;
   j) repeating steps (e) to (i), typically until all of the dimensionally reduced camera fingerprints have been processed;
   k) performing a clustering algorithm on all dimensionally reduced camera fingerprints based on the pairings having a comparatively higher level of similarity to produce a plurality of first clusters each comprising a set of dimensionally reduced camera fingerprints;
   l) for each of the first clusters, determining a level of similarity between each of the camera fingerprints corresponding to the dimensionally reduced camera fingerprints of that cluster; and
   m) splitting and merging the coarse clusters dependent upon the similarities between the camera fingerprints to form a plurality of second clusters.

2. The method of claim 1, in which the step of extracting a camera fingerprint comprises processing the images using a denoising filter.

3. The method of claim 1, in which each camera fingerprint is representative of the sensor pattern noise of the camera used to capture the image.

4. The method of claim 1, in which the step of extracting a camera fingerprint comprises normalising the mean and/or standard deviation of each fingerprint.

5. The method of claim 1, in which the step of forming the dimensionally reduced camera fingerprints comprises using a sparse random projection to reduce the dimension of each camera fingerprint.

6. The method of claim 1, in which the method comprises storing the camera fingerprints and the dimensionally reduced fingerprints, in a first storage, which may comprise a mass storage device such as a hard disk, or another secondary storage device, associated with each processor.

7. The method of claim 1, in which the first and second subsets are the same size.

8. The method of claim 6, in which the first and second subsets are each of a size such that the dimensionally reduced camera fingerprints they represent fit within a second storage, which may be a primary storage device, such as a random access memory associated with each processor.

9. The method of claim 8, comprising loading the dimensionally reduced camera fingerprints of the first and second subsets into the second storage.

10. The method of claim 8, in which the first and second subsets are of a size such that a further subset of dimensionally reduced camera fingerprints of the same size as the first and/or second subsets would not fit within the second storage.

11. The method of claim 1, in which the steps of determining a level of similarity between dimensionally reduced camera fingerprints each comprise determining a correlation between the dimensionally reduced camera fingerprints.

12. The method of claim 11, in which the steps of determining a level of similarity between dimensionally reduced camera fingerprints comprise converting the similarity to a binary value by indicating similarity if the level of similarity is higher than a threshold and no similarity otherwise.

13. The method of claim 1, in which the step of recording the pairings comprises recording in a set of lists, each for one dimensionally-reduced camera fingerprint, where the elements of each list indicate the dimensionally-reduced camera fingerprints that are sufficiently similar with the corresponding dimensionally-reduced camera fingerprint.

14. The method of claim 1, in which the step of substituting the contents of the first subset comprises determining which elements of the first and second subsets have been recorded less frequently and eliminating those elements from the first and second subsets, with the elements which have not been eliminated then forming the new first subset.

15. The method of claim 14, in which the step of substituting the contents of the first subset comprises determining a measure of frequency for each dimensionally reduced camera fingerprint, which may be calculated as:

$$p_i = \frac{deg(v_i)}{A_i}$$

where $p_i$ is the measure of frequency, $deg(v_i)$ is the number of pairings in which the dimensionally reduced camera fingerprint has been recorded and $A_i$ is the number of pairings in steps (d) and (e) for which a similarity including the dimensionally reduced camera fingerprint has been determined.

16. The method of claim 1, in which step (h) includes eliminating sufficient elements so that the first subset after substitution is the same size as before substitution.

17. The method of claim 1, in which Step (1) comprises the step of generating a matrix of the level of similarities between the camera fingerprints.

18. The method of claim 17, in which the matrix is binarised, such that each element can only have two values.

19. The method of claim 18, in which step (1) comprises the step of applying a threshold to the level of similarities, such that an element in the matrix will indicate similarity if the level of similarity is greater than a threshold.

20. The method of claim 1, in which step (m) comprises applying a Markov clustering algorithm to the matrix.

21. The method of claim 1, comprising capturing each of the images using a digital camera.

22. The method of claim 1, comprising outputting the second clusters.

23. The method of claim 1, in which each of the second clusters will indicate those digital images having similar camera fingerprints.

24. A processing apparatus comprising a processor arranged to carry out the method of claim 1.

25. The processing apparatus of claim 24, comprising at least one of:
first storage being mass storage such as a hard disk or other secondary storage,
second storage, being primary storage such as random access memory.

26. The processing apparatus of claim 25, in which the first or second storage comprise program instructions which, when executed on the processor, will cause it to carry out the method claim 1.

* * * * *